(12) United States Patent
Breitenborn et al.

(10) Patent No.: US 11,360,022 B2
(45) Date of Patent: Jun. 14, 2022

(54) METHOD AND SYSTEM FOR DETERMINATION OF PHOTOTHERMAL PROPERTIES OF PARTICLES

(71) Applicants: INSTITUT NATIONAL DE LA RECHERCHE SCIENTIFIQUE, Quebec (CA); VALORBEC SOCIÉTÉ EN COMMANDITE, Montreal (CA)

(72) Inventors: Holger Breitenborn, Longueuil (CA); Junliang Dong, Longueuil (CA); Riccardo Piccoli, Montreal (CA); Roberto Morandotti, Montreal (CA); Luca Razzari, Mont-Royal (CA); Rafik Naccache, Laval (CA); Fiorenzo Vetrone, Montreal (CA)

(73) Assignees: INSTITUT NATIONAL DE LA RECHERCHE SCIENTIFIQUE; VALORBEC SOCIÉTÉ EN COMMANDITE

( * ) Notice: Subject to any disclaimer, the term of this patent is extended or adjusted under 35 U.S.C. 154(b) by 0 days.

(21) Appl. No.: 16/938,152

(22) Filed: Jul. 24, 2020

(65) Prior Publication Data
US 2021/0025816 A1   Jan. 28, 2021

Related U.S. Application Data

(60) Provisional application No. 62/878,026, filed on Jul. 24, 2019.

(51) Int. Cl.
*G01N 21/3581* (2014.01)
*G01J 5/00* (2022.01)

(52) U.S. Cl.
CPC ........ *G01N 21/3581* (2013.01); *G01J 5/0037* (2013.01); *G01J 2005/0077* (2013.01)

(58) Field of Classification Search
CPC ............... G01N 21/3581; G01J 5/0037; G01J 2005/0077
See application file for complete search history.

(56) References Cited

U.S. PATENT DOCUMENTS 2,816,997 A   12/1957   Conrad
6,751,497 B2   6/2004   Fraden
(Continued)

FOREIGN PATENT DOCUMENTS

CN   108283723 A   *   7/2018
DE   3812560 C2   1/1998

OTHER PUBLICATIONS

Jiang, K., et al., "Size-dependent photothermal conversion efficiencies of plasmonically heated gold nanoparticles", J. Phys. Chem. C 117, 27073-27080 (2013).
(Continued)

*Primary Examiner* — Blake C Riddick
(74) *Attorney, Agent, or Firm* — Lavery, De Billy, LLP; Gwendoline Bruneau (57) ABSTRACT

A method and a system for determining material-, size-, and morphology-dependent photothermal properties of particles dispersed in solutions, the method comprising using coherently detected pulsed THz radiation, tracking a temperature-dependent refractive index change of the particles dispersion in time and space, and correlating the temperature-dependent refractive index change of the particles dispersion in time and space to temperature values. A system comprises a source of electromagnetic radiation; a THz emitter; a THz detector; and a vessel containing a dispersion of particles, wherein the source of electromagnetic radiation is configured to emit electromagnetic radiation to excite the particles in the dispersion; the THz emitter is configured to send THz
(Continued)

radiation to the vessel and the THz detector is configured to receives THz radiation returned by from the vessel.

20 Claims, 3 Drawing Sheets

(56) References Cited

U.S. PATENT DOCUMENTS

| | | | | |
|---|---|---|---|---|
| 9,414,024 | B2* | 8/2016 | Kychakoff | G01N 21/3581 |
| 10,213,785 | B2* | 2/2019 | Shieh | C01G 49/08 |
| 2003/0066968 | A1* | 4/2003 | Ziolo | H01S 3/16 |
| | | | | 250/341.1 |
| 2006/0289761 | A1* | 12/2006 | Nabet | H01L 31/108 |
| | | | | 250/336.1 |
| 2013/0126736 | A1* | 5/2013 | Kato | G01J 3/42 |
| | | | | 250/339.07 |
| 2013/0153790 | A1* | 6/2013 | Clough | G01N 21/63 |
| | | | | 250/473.1 |
| 2013/0222571 | A1* | 8/2013 | Kychakoff | G01N 21/3581 |
| | | | | 348/82 |
| 2013/0284930 | A1* | 10/2013 | Kato | G01N 21/3581 |
| | | | | 250/341.1 |
| 2015/0260695 | A1* | 9/2015 | Spartz | G01N 30/74 |
| | | | | 250/339.01 |
| 2015/0316511 | A1* | 11/2015 | Guo | G01N 29/221 |
| | | | | 398/140 |
| 2016/0069673 | A1* | 3/2016 | Takayanagi | G01B 11/0641 |
| | | | | 250/339.11 |
| 2016/0103256 | A1* | 4/2016 | Millar | G02B 5/0858 |
| | | | | 235/468 |
| 2018/0120246 | A1* | 5/2018 | Baucke | G01R 15/144 |
| 2020/0292449 | A1* | 9/2020 | Nebel | G01N 21/89 |

OTHER PUBLICATIONS

Wang, G., et al., "Understanding the photothermal effect of gold nanostars and nanorods for biomedical applications", RSC Adv. 4, 30375-30383 (2014).

Dragoman, D., "Terahertz fields and applications", Progress in Quantum Electronics 1, 1-66 (2004).

Roper, D.K., et al., "Microscale heat transfer transduced by surface plasmon resonant gold nanoparticles", J. Phys Chem. C 111, 3636-3641 (2007).

Margheri, G., et al., "Chitosan-Capped Au Nanoparticles for Laser Photothermal Ablation Therapy UV-Vis Characterization and Optothermal Performances", Journal of Spectroscopy 8271254 (2018).

Wang, Y., et al., "Comparison Study of Gold Nanohexapods, Nanorods, and Nanocages for Photothermal Cancer Treatment". ACS Nano 2013, 7 (3), 2068-2077.

Maestro, L. M., et al., "Gold Nanorods for Optimized Photothermal Therapy: The Influence of Irradiating in the First and Second Biological Windows". RSC Adv. 2014, 4 (96), 54122-54129.

Riley, R. S., et al., "Gold Nanoparticle-Mediated Photothermal Therapy: Applications and Opportunities for Multimodal Cancer Treatment". Wiley Interdiscip. Rev. Nanomedicine Nanobiotechnology 2017, 9 (4), e1449.

Baffou, G., et al., "Thermo-Plasmonics: Using Metallic Nanostructures as Nano-Sources of Heat". Laser Photon. Rev. 2013, 7 (2), 171-187.

Qin, Z., et al., "Quantitative Comparison of Photothermal Heat Generation between Gold Nanospheres and Nanorods". Sci. Rep. 2016, 6 (1), 29836.

Chen, H., et al., Understanding the Photothermal Conversion Efficiency of Gold Nanocrystals. Small 2010, 6 (20), 2272-2280.

Ansari, M. A., et al., "Mechanisms of Laser-Tissue Interaction: II. Tissue Thermal Properties". J. Lasers Med. Sci. 2013, 4 (3), 99-106.

Naccache, R., et al., "Thermometry: Combining Hyperspectral Imaging and Temperature Mapping at Terahertz Frequencies". Laser Photon. Rev. 2017, 1600342.

Liu, X., et al., "Laser Heating of Metallic Nanoparticles for Photothermal Ablation Applications". AIP Adv. 2017, 7 (2), 025308.

Pattani, V. P., et al., "Nanoparticle-Mediated Photothermal Therapy: A Comparative Study of Heating for Different Particle Types". Lasers Surg. Med. 2012, 44 (8), 675-684.

Jaque, D., et al., "Luminescence Nanothermometry". Nanoscale 2012, 4 (15), 4301-4326.

Macairan, J.-R., et al., "Intracellular Ratiometric Temperature Sensing Using Fluorescent Carbon Dots". Nanoscale Adv. 2019.

Tsai, M. F., et al., "Au Nanorod Design as Light-Absorber in the First and Second Biological near-infrared Windows for in Vivo Photothermal Therapy". ACS Nano 2013, 7 (6), 5330-5342.

Richardson, H. H., et al., "Experimental and Theoretical Studies of Light-to-Heat Conversion and Collective Heating Effects in Metal Nanoparticle Solutions". Nano Lett. 2009, 9 (3), 1139-1146.

Cole, J. R., et al., "Photothermal Efficiencies of Nanoshells and Nanorods for Clinical Therapeutic Applications". J. Phys. Chem. C 2009, 113 (28), 12090-12094.

Marin, R., et al., "Highly Efficient Copper Sulfide-Based Near-Infrared Photothermal Agents: Exploring the Limits of Macroscopic Heat Conversion". Small 2018, 14 (49), 1-9.

Dong, J., et al., "Terahertz Superresolution Stratigraphic Characterization of Multilayered Structures Using Sparse Deconvolution". IEEE Trans. Terahertz Sci. Technol. 2017, 7 (3), 260-267.

Chen, X., et al., "A Robust Baseline and Reference Modification and Acquisition Algorithm for Accurate THz Imaging". IEEE Trans. Terahertz Sci. Technol. 2017, 7 (5), 493-501.

Fan, S., et al., "Calibration Method to Improve the Accuracy of THz Imaging and Spectroscopy in Reflection Geometry". Photonics Res 2016, 4 (3), A29.

Maier, S. A., "Plasmonics: Fundamentals and Applications", Springer US: New York, NY, 2007.

Kou, L., et al., "Refractive Indices of Water and Ice in the 0.65- to 2.5-μm Spectral Range". Appl. Opt. 1993, 32 (19), 3531.

Johnson, P. B., et al., "Optical Constants of the Noble Metals". Phys. Rev. B 1972, 6 (12), 4370-4379.

* cited by examiner

METHOD AND SYSTEM FOR DETERMINATION OF PHOTOTHERMAL PROPERTIES OF PARTICLES

CROSS-REFERENCE TO RELATED APPLICATIONS

This application claims benefit of U.S. provisional application Ser. No. 62/878,026, filed on Jul. 24, 2019. All documents above are incorporated herein in their entirety by reference.

FIELD OF THE INVENTION

The present invention relates to determination of photothermal properties of particles. More specifically, the present invention is concerned with a method and system for the determination of photothermal properties of particles by terahertz (THz) radiation.

BACKGROUND OF THE INVENTION

Photothermal therapies in biomedical applications use laser illumination in combination with plasmonic particles, such as nanoparticles, to generate heat locally and induce desired temperature-induced effects in tissues. These effects are highly sensitive to a change in temperature and can result for example, in hyperthermia starting at about 40° C., protein denaturation starting at about 60° C., vaporization and thermal decomposition by ablation appearing at about 100° C. Therefore, the accurate evaluation of the photothermal properties of nanoparticles is essential for their proper use in modern nanomedicine. Specifically, photothermal therapies, in which hyperthermia is induced in biological tissues to destroy cancerous cells, require a precise control of nanoparticles to quickly and adequately elevate the temperature of the aqueous volume surrounding the nanoparticles. Interestingly, the photothermal behavior of nanoparticles can be tuned by selecting their size, shape, material, surface functionalization, and/or coatings, for example, allowing to select and/or combine these parameters in view of a target temperature profile for each given application. Therefore, determining the photothermal conversion efficiency and molar heating rate of nanoparticles is a crucial step to characterize and subsequently use the nanoparticles as local heating agents. Moreover, understanding the heating dynamics helps to maximize the performance of nanoparticles in photothermal applications, because the localization of the heat and magnitude of the temperature rise can be predicted and adjusted.

A currently widely used method uses thermistor-based thermometers that rely on direct physical contact with the nanoparticles dispersion, using thermocouple probes inserted into cuvettes containing the dispersion, to record temperature changes of the dispersion at several locations. A magnetic stir bar is often used to achieve an equally distributed temperature. Temperature profiles during heating and cooling cycles are used to obtain the photothermal conversion efficiency and molar heating rate, provided knowledge of specific parameters such as the mass and the heat capacity of the nanoparticles dispersion. Since the thermistor-based thermometer method requires direct contact, damage and/or contamination may occur, as well as measurement interferences. Moreover, in case the thermal distribution in space is required, thermometers offer a poor spatial resolution, and the measurement cannot reliably be performed within the illuminating laser spot, which is obstructed by the thermocouple probe itself and strongly influenced by the heating laser beam.

Other methods relying on non-contact-based temperature measurements are typically performed by infrared (IR) single-point thermometry, or IR thermography for spatial 2D thermal information. Since the temperature profile is traced by recording IR radiation, for wavelengths comprised in a range between about 9 and about 14 µm, emitted from a laser-heated nanoparticle dispersion inside a cuvette; the transmission property of the cuvette at these wavelengths interferes with the temperature information. IR thermometers and thermographic cameras can only measure surface temperatures, which means the IR radiation emanated by the cuvette. As a result, the amount of IR radiation from the nanoparticles dispersion is filtered by the cuvette and therefore does not represent the temperature value of the heated nanoparticles dispersion itself. Moreover, temperature measurements can only be done in a direct line of sight without obstruction. Again, the dispersion is usually stirred by a magnetic bar for equal temperature distribution.

There is a need for a method and system for the determination of the photothermal properties of particles.

SUMMARY OF THE INVENTION

More specifically, in accordance with the present invention, there is provided a method for determination of photothermal properties of particles, comprising sending incident THz radiation to a vessel containing a particle dispersion- and recording first THz images of the vessel at a reference temperature; recording second THz images of the vessel when a maximum temperature is reached within the vessel under illumination of the vessel containing the particle dispersion with electromagnetic radiation; correlating the recorded THz images of the vessel to temperature; obtaining a map of the thermal distribution of the vessel of the vessel from the correlation; and integrating in space the normalized thermal distribution of the vessel, thereby yielding the effective mass of the nanoparticle dispersion.

There is further provided a method for determining material-, size-, and morphology-dependent photothermal properties of particles dispersed in solutions, comprising using coherently detected pulsed THz radiation, tracking a temperature-dependent refractive index change of the particles dispersion in time and space, and correlating the temperature-dependent refractive index change of the particles dispersion in time and space to temperature values.

There is further provide a system for determination of photothermal properties of particles, comprising a source of electromagnetic radiation; a THz emitter; a THz detector; and a vessel containing a dispersion of particles, wherein the source of electromagnetic radiation is configured to emit electromagnetic radiation to excite the particles in the dispersion; the THz emitter is configured to send THz radiation to the vessel and the THz detector is configured to receives THz radiation returned by from the vessel.

Other objects, advantages, and features of the present invention become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further detail by the following non-limiting examples.

Figure 1:
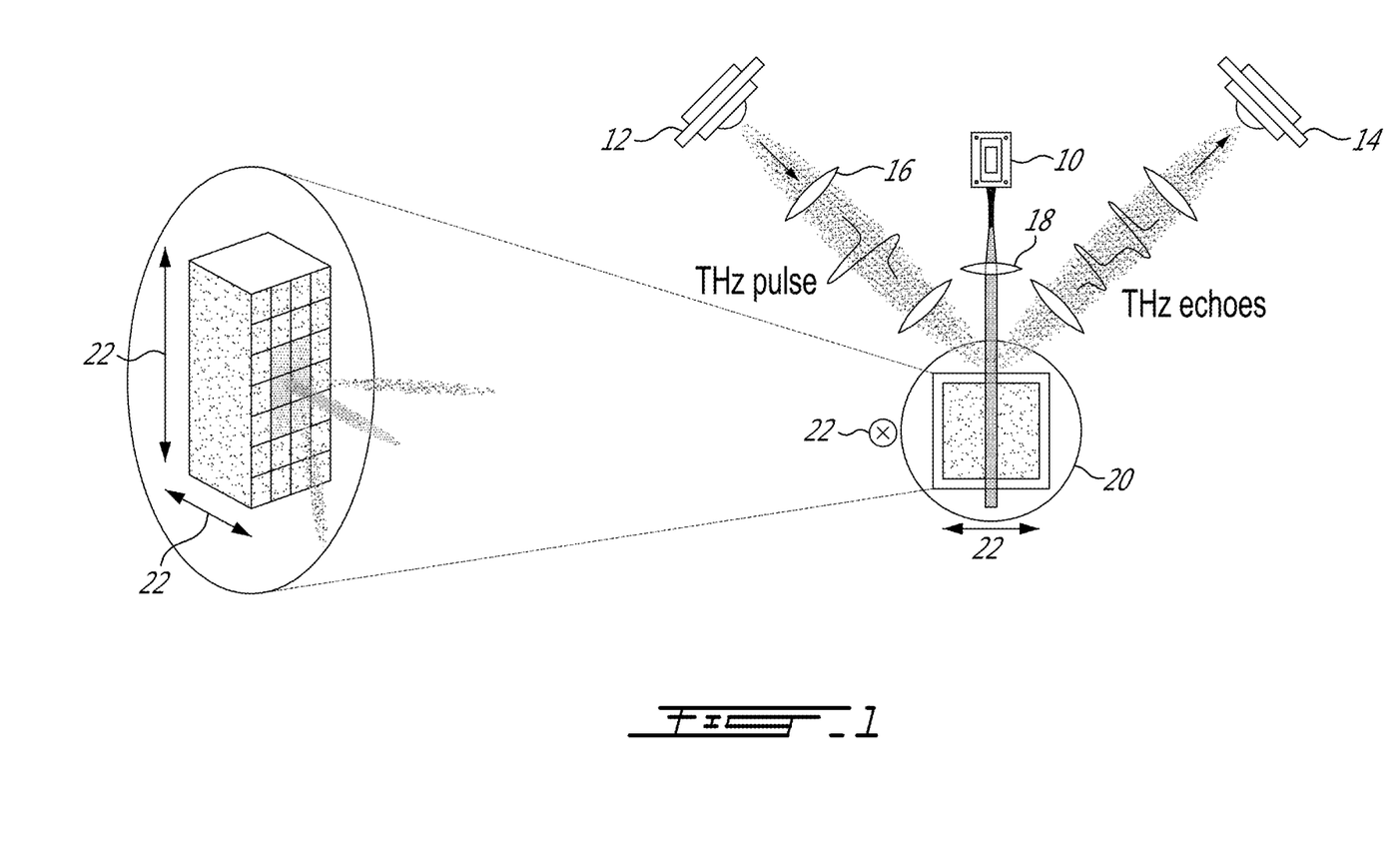
FIG. 1 is a schematic view of a system according to an embodiment of an aspect of the present disclosure.

A system, according to an embodiment of an aspect of the present disclosure, as illustrated in FIG. 1, for example, comprises a source of electromagnetic radiation (10), a THz emitter (12), a THz detector (14), optics (16), (18), and a vessel (20) containing a dispersion of particles.

The source of electromagnetic radiation (10) may be a laser or a light-emitting diode, for example, having a power in the range from about 100 µW and 100 W.

The THz emitter (12) is a source of THz radiation of a central frequency in a range between about 0.1 and about $10 \times 10^{12}$ Hz.

The THz emitter (12) and THz detector (14) may be photoconductive antennas, nonlinear solid-state media, liquids, plasmas, and spintronic emitters driven by a laser, quantum cascade lasers, Gunn diodes or high-electron-mobility transistors, for example. The THz emitter (12) and THz detector (14) are configured in reflection or transmission geometry.

The optics (16), (18) may be mirrors or lenses made of dielectrics, semiconductors, metals, silica, or polymers, for example.

The vessel (20) is made of a material transparent in the THz frequency range, such as polyethylene, glass, fused silica, or sapphire, for example.

Upon excitation by the source of electromagnetic radiation (10), the particles of the dispersion of particles within the vessel (20) irradiated by a beam from the source of electromagnetic radiation (10) release thermal energy. The particles may be gold, silver, carbon, platinum, or palladium, for example. They may be shaped in different morphologies, such as rods, spheres, wires, cubes, bipyramids, or stars, for example. They may be provided with different coatings, such as silica, for example. They may be provided with different capping ligands, such as hexadecyltrimethylammonium bromide (CTAB), citrate, branched polyethyleneimine (PEI), polyacrylic acid (PAA), polyallylamine (PAH) and polyvinylpyrrolidone (PVP), for example. They may be functionalized with surface modifiers. The solvent may be water, ethanol, or isopropanol, for example.

THz radiation from the THz emitter (12) impinges on the vessel (20), and is then received by the THz detector (14). The THz radiation may interrogate the dispersion within the vessel (20) multiple times before reaching the THz detector (14).

The vessel (20) and the source of electromagnetic radiation (10) are connected so that they can move together as a unit by a translation stages (22), by a plate (not shown) to which both are solidly attached for example. Alternatively, the THz emitter (12) and the THz detector (14) are connected so that they can be moved together as a unit by the translation stages (22). The translation stages (22) is operated either to move the vessel (20) together with the electromagnetic radiation source (10), or to move the THz emitter (12) together with the THz detector (14), for scanning of the vessel (20).

THz reflectivity or transmissivity images of the part of the vessel (20) containing the particle dispersion are taken by a raster-scan method by using the translation stages (22).

A method according to an embodiment of an aspect of the present disclosure comprises recording THz radiation, reflected off or transmitted through, the interface between the vessel and the particle dispersion, at room temperature the source of electromagnetic radiation being turned off, as a reference; recording THz radiation, reflected off or transmitted through, the interface between the vessel and the particle dispersion at the maximum temperature reached within the vessel under excitation by the source of electromagnetic radiation once turned on (heating); correlating the recorded THz reflectivity or transmissivity images of the vessel to the temperature; using a calibration curve to obtain a map of the thermal distribution of the vessel from the correlation; and integrating in space the normalized thermal distribution of the vessel, thereby yielding the effective mass of the particle dispersion.

The method further comprises recording THz radiation, reflected off or transmitted through, the interface between the vessel and the particle dispersion during excitation by the source of electromagnetic radiation (heating) and cooling cycles (the source of electromagnetic radiation is turned off); recording a temporal temperature-dependent THz reflectivity or transmissivity profile during a heating cycle, i.e. the source of electromagnetic radiation being turned on and the electromagnetic radiation from the source of electromagnetic radiation exciting the dispersed particles thereby heating the particle dispersion inside the vessel until a maximum temperature is reached; turning off the source of electromagnetic radiations at the maximum temperature, recording a temperature-dependent Hz reflectivity or transmissivity profile of the cooling cycle from immediately after the source of electromagnetic radiations is turned off until the temperature inside the vessel reaches room temperature; correlating the temporal THz reflectivity or transmissivity profiles to temperature by using the calibration curve; combining the temporal temperature profiles of the heating and cooling cycles and the obtained effective mass of the particle dispersion, thereby yielding the photothermal conversion efficiency of the particle dispersion. The method further comprises computing the time derivative evaluated at t=0 of the fitted temperature profile during the heating cycle and dividing by the molar concentration of the particle dispersion, determined for example via inductively coupled plasma mass spectrometry or volumetric analysis, thereby yielding the molar heating rate of the particle dispersion.

As people in the art will appreciate, the present method comprises combining spatial and temporal thermal information obtained at THz frequencies to determine material-, size-, and morphology-dependent photothermal properties of particles dispersed in aqueous solutions. Since THz radiation covers the electromagnetic frequency range from 0.1 to $10 \times 10^{12}$ Hz (wavelengths in a range from 3 mm and 30 µm), and the refractive index of water for instance in the THz frequency range is highly sensitive to temperature changes, a precise temperature measurement of particle dispersions is obtained. THz radiation allows non-contact, non-invasive, and non-destructive characterization. The method may be extended to cases when the particle dispersion is obstructed by a material that is sufficiently transparent in the THz frequency range.

The method uses coherently detected pulsed THz radiation, i.e., phase and amplitude information are retrieved simultaneously. A THz time-domain-spectroscopy (THz-TDS) system set in reflection or transmission, as illustrated for example in FIG. 1, is used to track the temperature-dependent refractive index change of the particle dispersions in time and space, and correlates the temperature-dependent refractive index change of the particle dispersions in time and space to temperature values.

There is thus provided a method for characterization of the photothermal properties of materials having a temperature-dependent change of the refractive index in the THz frequency region.

In an experiment, a gold nanorods dispersion was characterised, using a cuvette made of polyethylene. THz time-domain-waveforms, which allows measuring temperature directly at the heat source, at a specific interface, and even inside of vessels such as cuvettes or lab-on-chip devices, was used to obtain THz time-of-flight information. The temperature was thus precisely measured at the gold nanorods dispersion/cuvette interface within the exciting laser spot, in absence of thermal distribution irregularities.

Figure 2:
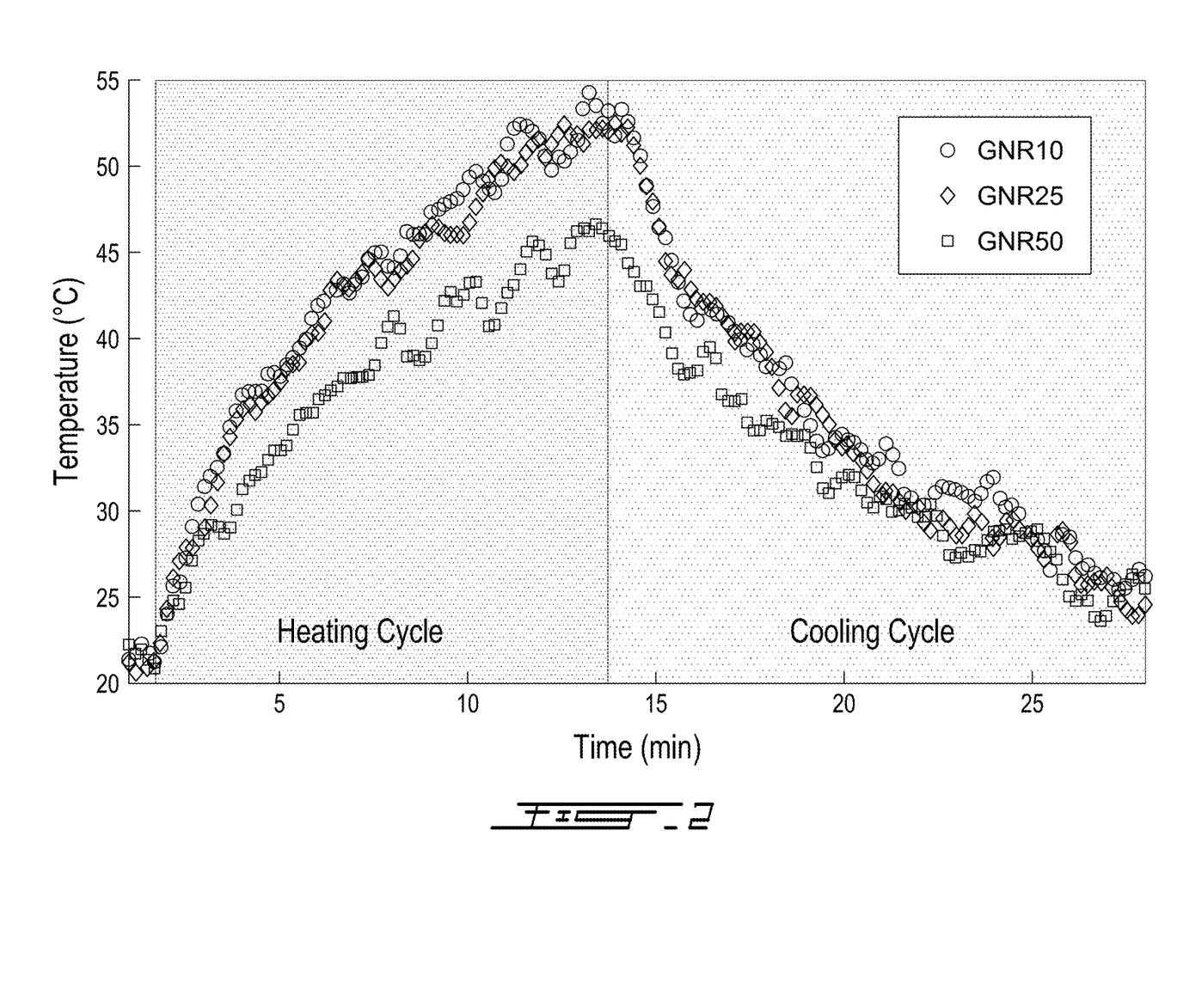
FIG. 2 shows experimental temperature profiles of nanoparticle dispersions according to an embodiment of the present disclosure.

The measured THz values were subsequently converted to temperature by calibration. Temperature profiles of the gold nanorods dispersion were obtained, as shown in FIG. 2, for three gold nanorods dispersions differing in particle size: GNR10 (10 nm×41 nm—short×long axis of a "wire-like" nanorod), GNR25 (25 nm×90 nm) and GNR50 (50 nm×150 nm).

Figure 3A:
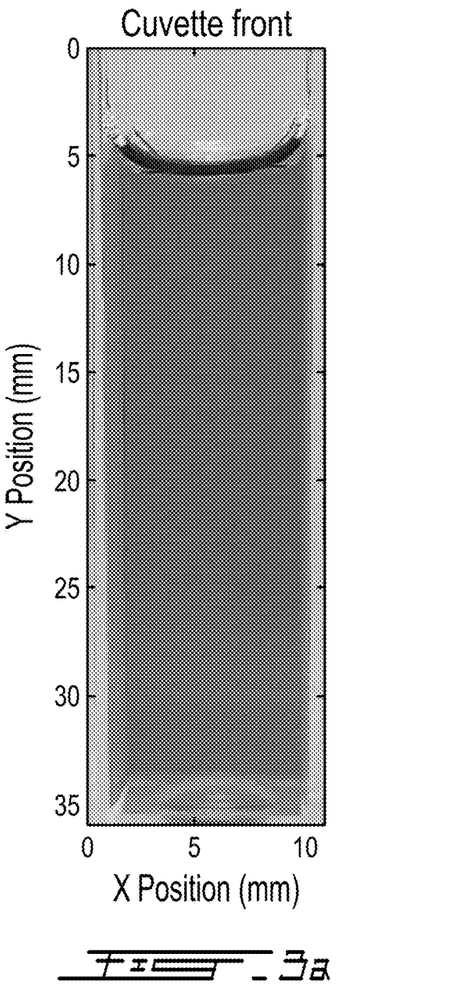
FIG. 3A shows a digital image of the front surface of a cuvette containing a nanoparticles dispersion according to an embodiment of an aspect of the present disclosure.
Figure 3B:
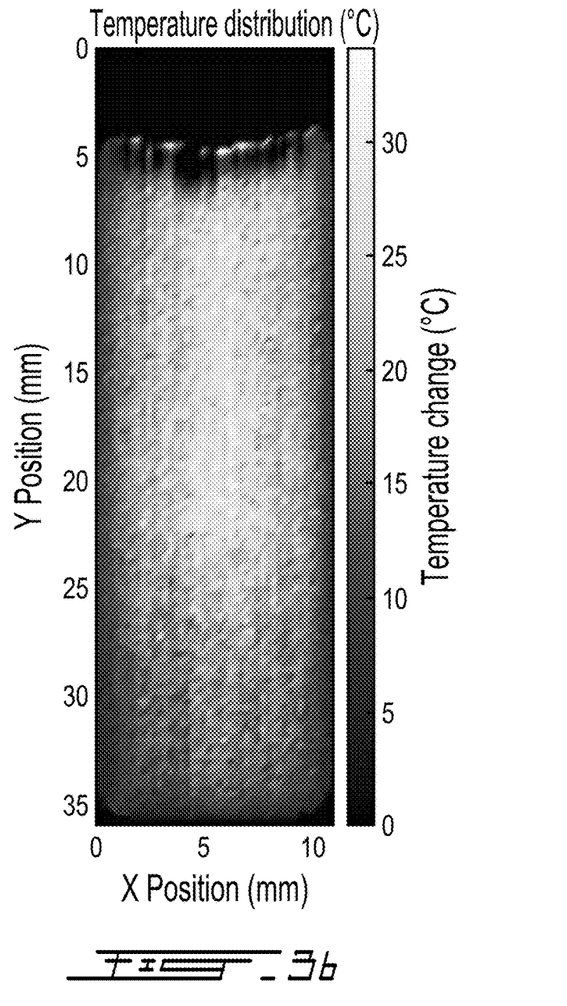
FIG. 3B shows a THz temperature difference image obtained via subtracting a THz raster-scan image taken at room temperature and a THz raster-scan image taken at the maximum temperature reached by the nanoparticles dispersion inside the cuvette shown in FIG. 3A.

The photothermal properties of the gold nanorods were thus determined in the absence of physical contact with the gold nanorods. The temperature distribution was not uniform within the cuvette during the heating and cooling cycles. In order to determine the effective mass of the gold nanorods dispersion, the spatially resolved thermal distribution inside the cuvette was mapped in THz temperature profiles by THz raster-scan imaging, by recording THz waveforms pixel-by-pixel and subsequently translating the THz waveforms to temperature values. The THz temperature profiles (FIG. 3B) were recorded first at room temperature and then at the maximum temperature when the thermal equilibrium was reached within the cuvette during a heating cycle in which the laser excited the gold nanorods in the gold nanorods dispersion within the cuvette and no temperature evolution in time was recorded. Subsequently, by calculating the THz temperature difference image between the two THz temperature profiles, the effective mass of the gold nanorods dispersion was determined using the following relation (1):

$$m_{eff} = \frac{\iint T(x,y)dxdy}{S_A} m_{dis} \quad (1)$$

where $T(x,y)$ is the normalized temperature distribution of the vessel front surface (THz temperature difference image), dx and dy the dimensions of one pixel of the THz image, $S_A$ is the area of the vessel surface, and md/s is the entire mass of the nanoparticle dispersion in the vessel. The effective mass of the vessel is determined as $m_{eff}/m_{dis} \times m_{ves}$, where $m_{ves}$ accounts for the mass of the vessel surrounding the nanoparticle dispersion.

Finally, by combining the time-resolved temperature profile (FIG. 2) with the THz temperature difference image (FIG. 3B), the experimental photothermal conversion efficiency q was obtained using the following relation (2), which describes the heat absorption (A) and dissipation (8) rate of the nanoparticle dispersion in the vessel:

$$\eta = \frac{A \sum_i m_i C_i}{P(1 - 10^{-AV_\lambda})} \quad (2)$$

where $m_i$ and $C_i$ are the mass and the specific heat capacities of each component i of a physical system, defined here as the nanoparticle dispersion and the vessel. For commonly analyzed nanoparticle dispersions, the mass of the solute is insignificant compared to the mass of the solvent and the mass and heat capacity of the solvent may be used to approximate the mass of the entire dispersion. P is the incident laser power employed to excite the plasmon resonance of the dispersed nanoparticles. $AV_\lambda$ is the absorbance value of the nanoparticle dispersion at the excitation wavelength of the laser source, which may be determined using conventional VIS/IR spectroscopy devices.

To retrieve the photothermal conversion efficiency η, the temperature variation of the nanoparticle dispersions as a function of time is measured during both the photothermal heating (under laser excitation, A≠0 and $T_{initial}=T_0$) and the subsequent cooling (A=0 and $T_{initial}>T_0$) cycle. The rate of heat absorption A and the heat dissipation rate B are obtained by fitting the experimentally retrieved temperature profiles (T) (FIG. 2) using the relation (3):

$$T(t) = T_0 + \frac{A}{B}(1 - e^{-Bt}) + (T_{initial} - T_0)e^{-Bt} \quad (3)$$

where $T_0$ is the ambient temperature, $T_{initial}$ is an arbitrary initial temperature value, t is time. B may be determined by using the experimentally retrieved temperature profile during the cooling cycle with the relation following (4):

$$B = \ln\left[\frac{(T(t) - T_0)}{(T_{max} - T_0)}\right] \quad (4)$$

where $T_{max}$ is the maximum temperature achieved during the photothermal heating.

The molar heating rate (MHR) corresponding to the concentration-normalized heating speed of the nanoparticle dispersion is obtained using the following relation (5):

$$MHR = \frac{T'(t=0)}{c} \quad (5)$$

where T' (t=0) is the time derivative evaluated at t=0 of the fitted temperature profile during the heating cycle, c is the molar concentration.

A THz-TDS system is used to record the temperature evolution during laser illumination of a particle dispersion that is located inside an enclosure. By combining temperature transients and thermal images recorded at THz frequencies measured directly at the interface between the enclosure and the particle dispersion, the photothermal conversion efficiency and molar heating rate of the particles are determined in the absence of physical contact with the particle dispersion. Non-contact, non-invasive, and non-destructive characterization of the material-, size-, and morphology-dependent photothermal properties of the plasmonically heated particles is thus obtained.

The present method and system may be applied for automation of the thermal characterization determination of aqueous material dispersions within confined enclosures.

The present method and system may be applied to characterize and tailor materials for photothermal heating and imaging applications in biomedicine, thermal catalysis, lab-on-chip, and cancer detection and treatment, for example.

The present method and system may be applied to characterize and tailor the thermal properties of a material.

The scope of the claims should not be limited by the embodiments set forth in the examples but should be given the broadest interpretation consistent with the description as a whole.

REFERENCES

[1] "Resistance thermometer," granted U.S. Pat. No. 2,816,997A (priority date: 23 Feb. 1955).
[2] K. Jiang, D. Smith, and A. Pinchuk, "Size-dependent photothermal conversion efficiencies of plasmonically heated gold nanoparticles," J. Phys. Chem. C 117, 27073-27080 (2013).
[3] X. Wang, G. Li, Y. Ding, and S. Sun, "Understanding the photothermal effect of gold nanostars and nanorods for biomedical applications," RSC Adv. 4, 30375-30383 (2014).
[4] "Infrared thermometer," granted U.S. Pat. No. 6,751,497B2 (priority date: 14 Mar. 2002).
[5] "Thermal camera," granted DE3812560A1 (priority date: 15 Apr. 1988).
[6] D. Dragoman, M. Dragoman, "Terahertz fields and applications," Progress in Quantum Electronics 1, 1-66 (2004).
[7] D. K. Roper, W. Ahn, and M. Hoepfner, "Microscale heat transfer transduced by surface plasmon resonant gold nanoparticles," J. Phys. Chem. C 111, 3636-3641 (2007).
[8] G. Margheri, S. Trigari, M. Berti, M. M. Miranda, and R. Traversi, "Chitosan-Capped Au Nanoparticles for Laser Photothermal Ablation Therapy: UV-Vis Characterization and Optothermal Performances," Journal of Spectroscopy 8271254 (2018).
[9] X. Wang, G. Li, Y. Dingab, and S. Sun, "Understanding the photothermal effect of gold nanostars and nanorods for biomedical applications," RSC Adv. 4, 30375-30383 (2014).

The invention claimed is:

1. A method for determination of photothermal properties of particles, comprising:
sending incident THz radiation to a vessel containing a particle dispersion-and recording first THz images of the vessel at a reference temperature;
recording second THz images of the vessel when a maximum temperature is reached within the vessel under illumination of the vessel containing the particle dispersion with electromagnetic radiation;
correlating the recorded THz images of the vessel to temperature;
obtaining a map of the thermal distribution of the vessel from the correlation; and
integrating in space the normalized thermal distribution of the vessel, thereby yielding the effective mass of the nanoparticle dispersion.

2. The method of claim 1, wherein said recording the first and said recording second THz images of the vessel comprise using a raster-scan method.

3. The method of claim 1, wherein said recording the first and said recording the second THz images of the vessel comprise recording ones of: i) THz images reflected off an interface between the vessel and the particle dispersion, and ii) THz images transmitted through the interface between the vessel and the particle dispersion.

4. The method of claim 1, comprising providing a source of electromagnetic radiation; said recording the first THz images of the vessel comprises recording one of: i) THz radiation reflected off, and ii) THz radiation transmitted through, an interface between the vessel and the particle dispersion with the source of electromagnetic radiation being turned off, as a reference; said recording the second THz images of the vessel comprises recording T recording one of: i) THz radiation reflected off, and ii) THz radiation transmitted through, the interface between the vessel and the particle dispersion at a maximum temperature reached within the vessel under excitation by the source of electromagnetic radiation once turned on; correlating the recorded THz reflectivity or transmissivity images of the vessel to temperature; obtaining a map of the thermal distribution of the vessel from the correlation; and integrating in space a normalized thermal distribution of the vessel, thereby yielding the effective mass of the particle dispersion.

5. The method of claim 1, comprising providing a source of electromagnetic radiation; said recording the first THz images of the vessel comprises recording THz radiation of the vessel during illumination of the vessel by the source of electromagnetic radiation; said recording the second THz images of the vessel comprises recording THz radiation of the vessel with the source of electromagnetic radiation being turned off; recording a first temporal temperature-dependent THz profile during illumination of the vessel by the source of electromagnetic radiation until a maximum temperature is reached; turning off the source of electromagnetic radiation at the maximum temperature and recording a second temperature-dependent THz profile; correlating the first and second temporal temperature-dependent THz profiles to temperature; combining the first and second temporal temperature-dependent profiles and an effective mass of the particle dispersion, thereby yielding a photothermal conversion efficiency of the particle dispersion.

6. The method of claim 1, comprising providing a source of electromagnetic radiation; said recording the first THz images of the vessel comprises recording one of: i) THz radiation reflected off, and ii) THz radiation transmitted through, an interface between the vessel and the particle dispersion with the source of electromagnetic radiation being turned off, as a reference; said recording the second THz images of the vessel comprises recording T recording one of: i) THz radiation reflected off, and ii) THz radiation transmitted through, the interface between the vessel and the particle dispersion at a maximum temperature reached within the vessel under excitation by the source of electromagnetic radiation once turned on; correlating the recorded THz reflectivity or transmissivity images of the vessel to temperature; obtaining a map of the thermal distribution of the vessel from the correlation; and integrating in space a normalized thermal distribution of the vessel, thereby yielding the effective mass of the particle dispersion;
the method further comprising:
recording third THz radiation of the vessel during excitation by the source of electromagnetic radiation and fourth THz radiation of the vessel with the source of electromagnetic radiation being turned off;

recording a first temporal temperature-dependent THz profile during excitation by the source of electromagnetic radiation until a maximum temperature is reached;

turning off the source of electromagnetic radiation at the maximum temperature and recording a second temperature-dependent THz profile;

correlating the first and second temporal temperature-dependent THz profiles to temperature;

combining the first and second temporal temperature-dependent profiles and the obtained effective mass of the particle dispersion, thereby yielding a photothermal conversion efficiency of the particle dispersion.

7. The method of claim 1, comprising providing a source of electromagnetic radiation; said recording the first THz images of the vessel comprises recording one of: i) THz radiation reflected off, and ii) THz radiation transmitted through, an interface between the vessel and the particle dispersion with the source of electromagnetic radiation being turned off, as a reference; said recording the second THz images of the vessel comprises recording T recording one of: i) THz radiation reflected off, and ii) THz radiation transmitted through, the interface between the vessel and the particle dispersion at a maximum temperature reached within the vessel under excitation by the source of electromagnetic radiation once turned on; correlating the recorded THz reflectivity or transmissivity images of the vessel to temperature; obtaining a map of the thermal distribution of the vessel from the correlation; and integrating in space a normalized thermal distribution of the vessel, thereby yielding the effective mass of the particle dispersion;

the method further comprising:

recording third THz radiation of the vessel during excitation by the source of electromagnetic radiation and fourth THz radiation of the vessel with the source of electromagnetic radiation being turned off;

recording a first temporal temperature-dependent THz profile during excitation by the source of electromagnetic radiation until a maximum temperature is reached;

turning off the source of electromagnetic radiation at the maximum temperature and recording a second temperature-dependent THz profile;

correlating the first and second temporal temperature-dependent THz profiles to temperature;

combining the first and second temporal temperature-dependent profiles and the obtained effective mass of the particle dispersion, thereby yielding a photothermal conversion efficiency of the particle dispersion; and obtaining the molar heating rate of the particle dispersion form the first temporal temperature-dependent THz profile and a molar concentration of the particle dispersion.

8. The method of claim 1, comprising providing a source of electromagnetic radiation; said recording the first THz images of the vessel comprises recording one of: i) THz radiation reflected off, and ii) THz radiation transmitted through, an interface between the vessel and the particle dispersion with the source of electromagnetic radiation being turned off, as a reference; said recording the second THz images of the vessel comprises recording T recording one of: i) THz radiation reflected off, and ii) THz radiation transmitted through, the interface between the vessel and the particle dispersion at a maximum temperature reached within the vessel under excitation by the source of electromagnetic radiation once turned on; correlating the recorded THz reflectivity or transmissivity images of the vessel to temperature; obtaining a map of the thermal distribution of the vessel from the correlation; and integrating in space a normalized thermal distribution of the vessel, thereby yielding the effective mass of the particle dispersion;

the method further comprising:

recording third THz radiation of the vessel during excitation by the source of electromagnetic radiation and fourth THz radiation of the vessel with the source of electromagnetic radiation being turned off;

recording a first temporal temperature-dependent THz profile during excitation by the source of electromagnetic radiation until a maximum temperature is reached;

turning off the source of electromagnetic radiation at the maximum temperature and recording a second temperature-dependent THz profile;

correlating the first and second temporal temperature-dependent THz profiles to temperature;

combining the first and second temporal temperature-dependent profiles and the obtained effective mass of the particle dispersion, thereby yielding a photothermal conversion efficiency of the particle dispersion; and computing the time derivative evaluated at $t=0$ of the fitted temperature profile during the excitation by the source of electromagnetic radiation and dividing by the molar concentration of the particle dispersion, thereby yielding the molar heating rate of the particle dispersion.

9. The method of claim 1, wherein said recording the first THz images of the vessel and said recording the second THz images of the vessel comprise recording ones of: i) THz radiation reflected off, and ii) THz radiation transmitted through, an interface between the vessel and the particle suspension.

10. The method of claim 1, wherein the incident THz radiation has a central frequency in a range between 0.1 and $10 \times 10^{12}$ Hz.

11. The method of claim 1, wherein the particles are ones of: gold, silver, carbon, platinum and palladium.

12. The method of claim 1, wherein the particles are ones of: rods, spheres, wires, cubes, bipyramids and star-shaped.

13. The method of claim 1, the particles are at least ones of: coated particles; ligands-capped and functionalized with surface modifiers.

14. A method for determining material-, size-, and morphology-dependent photothermal properties of particles dispersed in solutions, comprising using coherently detected pulsed THz radiation, tracking a temperature-dependent refractive index change of the particles dispersion in time and space, and correlating the temperature-dependent refractive index change of the particles dispersion in time and space to temperature values.

15. A system for determination of photothermal properties of particles, comprising:

a source of electromagnetic radiation;

a THz emitter;

a THz detector;

a vessel containing a dispersion of particles; and a THz time-domain-spectroscopy (THz-TDS) system;

at least one of i) the vessel and the source of electromagnetic radiation being connected, so that the vessel moves together with the electromagnetic radiation source for scanning of the vessel; and ii) the THz emitter and the THz detector being connected, so that the THz emitter moves together with the THz detector for scanning of the vessel;

wherein said source of electromagnetic radiation is configured to emit electromagnetic radiation to excite the particles in the dispersion; said THz emitter is configured to send THz radiation to said vessel, the THz radiation from the THz emitter impinging on the vessel being then received by the THz detector, said THz detector is configured to receive THz radiation returned by from the vessel, and said THz time-domain-spectroscopy (THz-TDS) system is used to track a temperature-dependent refractive index change of the dispersion of particles in time and space, and correlates the temperature-dependent refractive index change of the particle dispersions in time and space to temperature value.

16. The system of claim 15, wherein the THz emitter and the THz detector are set in one of: i) reflection and ii) transmission.

17. The system of claim 15, comprising translation stages configured to move one of: the THz emitter together with the THz detector as a unit, and ii) the source of electromagnetic radiation with the vessel as a unit.

18. The system of claim 15, wherein said particles are one of: gold, silver, carbon, platinum, and palladium.

19. The system of claim 15, wherein said particles are ones of: rods, spheres, wires, cubes, bipyramids and star-shaped.

20. The system of claim 15, wherein the particles are at least ones of: coated particles; ligands-capped and functionalized with surface modifiers.

* * * * *